ically, more trouble-free and less expensive than a variable capacity pump. The present invention includes means to control the speed of the motors by controlling the volume of fluid supplied to the motors allowing the system to operate at a relatively low pressure as compared to pressure generated by controlling the exhaust fluid pressure.

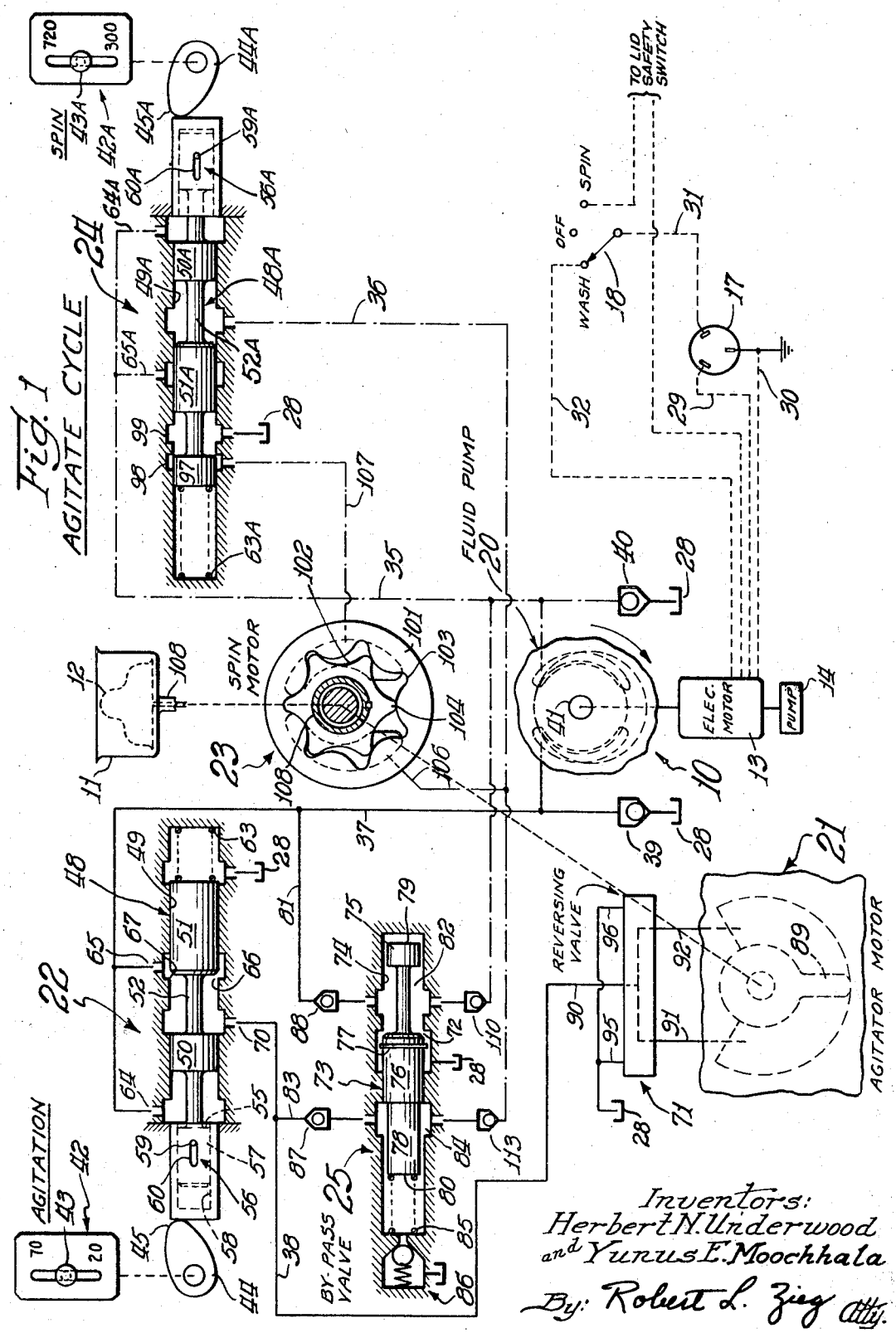

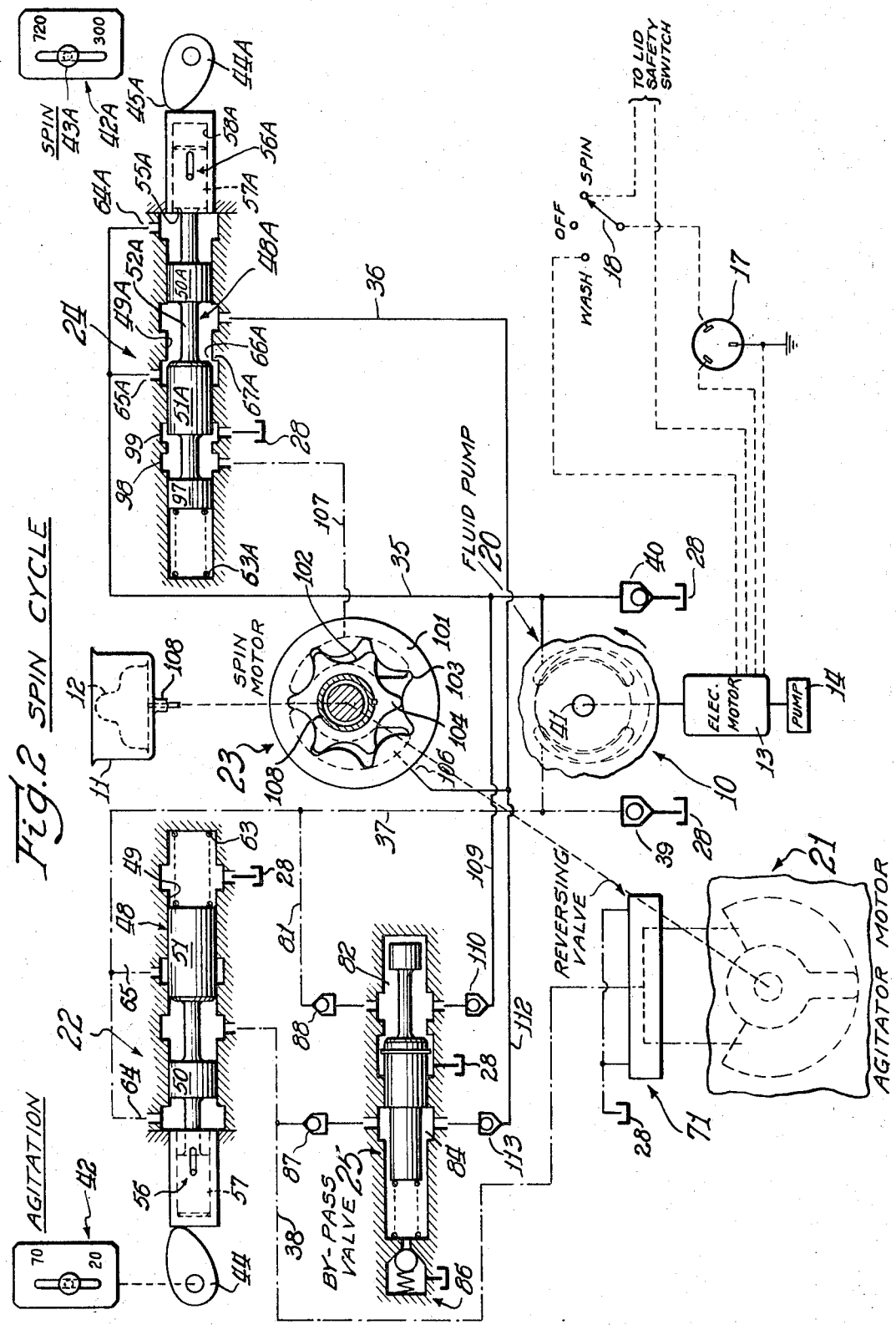

United States Patent Office 3,443,381
Patented May 13, 1969

3,443,381
HYDRAULIC TRANSMISSION WITH SPEED CONTROL
Herbert N. Underwood, Chicago, Ill., and Yunus E. Moochhala, Bombay, India, assignors to Borg-Warner Corporation, Chicago, Ill., a corporation of Illinois
Filed June 26, 1967, Ser. No. 648,630
Int. Cl. F16h 39/48
U.S. Cl. 60—53                              6 Claims

ABSTRACT OF THE DISCLOSURE

A hydraulic transmission for independently driving an agitator motor and a spin motor of an automatic washing machine with control mechanism for independently controlling the speed of each by using a manually adjustable cam to position a spool valve and thereby establish the size of a variable size orifice in the pressure line to the fluid motor. A bypass valve in fluid communication with both sides of the orifice is used to maintain a predetermined flow to the fluid motor in accordance with the manual adjustment of the cam by maintaining a constant pressure drop across the orifice.

Summary of the invention

This invention relates to hydraulic transmissions and more particularly to a hydraulic transmission particularly adapted for use in an automatic clothes washer although use in other machines would be contemplated.

Various approaches have been utilized to control the speed of the spin motor and the agitate motor in an automatic clothes washed driven by a hydraulic transmission. In a fluid circuit including a hydraulic pump and a pair of hydraulic motors one only of which motors is operable when the pump is rotated in either direction of rotation, two different types of pumps may be used, variable or fixed displacement.

If a variable volume pump is used, the speed of the motors is varied by varying the displacement of the fluid pump which may be done in a number of ways, one example is described in U.S. Patent No. 3,383,856 of common assignee.

If, however, a fixed displacement hydraulic pump is used to provide fluid pressure, other methods of controlling motor speeds must be devised. The motor speed may be controlled by a manually adjustable valve used to control the exhaust fluid pressure from the motor as described in U.S. Patent No. 3,330,138 of common assignee. This type system has the inherent disadvantage of operating at a considerably higher fluid pressure than that of the present invention.

The present invention makes use of a constant capacity hydraulic pump which is basically less complicated, more trouble-free and less expensive than a variable capacity pump. The present invention includes means to control the speed of the motors by controlling the volume of fluid supplied to the motors allowing the system to operate at a relatively low pressure as compared to pressure generated by controlling the exhaust fluid pressure.

The nature of the invention resides in controlling the speed of the hydraulic motors in a hydraulic transmission for driving a washing machine by controlling the flow of fluid to the hydraulic motor which is accomplished by varying an orifice in the feed line to the motor. This measure alone would not vary the flow to the motor if fluid is supplied by a constant capacity pump but would merely cause an increase in the average velocity of fluid across the orifice and result in a higher pressure drop across the orifice as it becomes more restricted.

The present invention provides means for communicating the fluid pressure both upstream and downstream of the orifice to either side of a bypass valve which is biased by a spring having a predetermined value. The bypass valve, by maintaining a constant pressure drop across the orifice for any orifice setting, varies the amount of fluid bypassed and therefore, the fluid flow to the motor.

Brief description of the drawings

FIGURE 1 is a schematic view of a hydraulic transmission for a clothes washer during the agitate cycle embodying the principles of the invention.

FIGURE 2 is a schematic view showing the hydraulic transmission during the spin cycle operation.

Description of the preferred embodiments

Referring to FIGURE 1, a hydraulic transmission 10 is illustrated for independently driving a clothes basket 11 or an agitator 12 of an automatic clothes washer. A motor 13 is provided having a water pump 14 driven thereby for recirculating water in the clothes basket of the automatic washer and a source of power 17 is illustrated for operating the motor 13. A cycle selector switch 18 is schematically illustrated in a simplified form although in a washer installation this function would be performed by a timer switch mechanism of known construction.

The important elements of the hydraulic transmission are as follows: a constant volume reversible fluid pump 20, an agitator motor 21, a control valve 22 for the agitator motor, a spin motor 23, a control valve 24 for the spin motor and a bypass valve 25 in fluid communication with both the agitator motor 21 and the spin motor 23.

A fluid sump 28 is provided which is schematically illustrated for convenience at various places in the illustration of the invention although in the actual construction one fluid sump 28 is provided into which all the exhaust connections for various elements of the transmission exhaust fluid pressure. Electric wires 29 and 30 interconnect the source of power 17 with the motor 13, the line 30 being a ground line. Wire 31 connects the source of power 17 to switch mechanism 18. Switch mechanism 18 is connected to the motor by a wire 32.

A fluid conduit 35 connects the constant volume pump 20 to the spin motor control valve 24, and a fluid conduit 36 connects the spin motor control valve 24 to the spin motor 23. A fluid conduit 37 is provided which connects the constant volume pump 20 to the agitator motor control valve 22 and a fluid conduit 38 connects the agitator motor control valve 22 to the agitator motor 21.

Conduit 35 is connected to the fluid sump 28 through a check valve 39 which allows fluid flow only in the direction from the sump into fluid pump 20 and then to conduit 35. Conduit 37 is connected to the fluid sump 28 through a check valve 40 which allows fluid flow only in a direction from the sump 28 into fluid pump 20 and then to conduit 37.

The constant volume pump 20 is illustrated as a vane pump commonly known in the art, but any suitable constant volume reversible pump may be used. The pump is provided with a shaft 41 which is driven by the electric motor 13 of the transmission. The constant volume pump 20 is operative to pump fluid in either a counterclockwise or clockwise direction of rotation and thereby supply fluid pressure either to conduit 35 or conduit 37, respectively.

A control mechanism 42 is supplied to selectively control the speed of the agitator and includes a control lever 43 suitably attached to a cam 44 having a face 45 and adapted to rotate the cam 44 according to a setting of the control lever 43 for the purpose which will soon become apparent.

A control mechanism 42A is supplied to selectively control the speed of the clothes basket 11 in the spin operation and is similar in design and operation to control mechanism 42, like numbers with the addition of suffix "A" being used to designate like components.

The agitator control valve 22 includes a spool valve 48 operating within a bore 49. The spool valve 48 consists of a land section 50 and a land section 51 of the same diameter separated by a smaller diameter valve section 52. One end 55 of the spool valve 48 includes a lost motion connection 56 in which a piston member 57 slides within a guide 58 whereby the lost motion connection is completed by a pin 59 extending radially from said piston member 57 and engaged within a slot 60 in the guide 58.

A spring 63 acts against the spool valve 48 to urge the control valve 22 in contact with the cam face 45. Fluid connections 64 and 65 admit fluid pressure to the control valve 22 from fluid conduit 37. When fluid pressure is communicated through fluid connection 64, the spool valve overcomes the force of the spring 63, and slides axially away from guide 58 as far as the lost motion connection 56 will permit it thereby establishing the size of an orifice 66 between the land section 51 and an edge 67 of the bore 49 as determined by the position of cam 44. A fluid connection 70 is provided to exhaust fluid from the bore 49 and to fluid conduit 38 which communicates it to the agitator motor 21 through a reversing valve 71 for effecting oscillation of the agitator 12.

The bypass valve 25 includes a spool valve 73 acting within a bore 74 defining a variable size orifice 72 in fluid communication with sump 28. The spool valve 73 has a guide 75 axially spaced from the valve body 76. The valve body 76 is provided with a flow deflector 77 and a portion 78 of the valve body 76 is reduced in diameter as is the guide 75 to allow fluid to flow past these portions in the bore 74. The guide 75 has an end face 79 against which the fluid pressure acts to exert a force on the spool valve 73. A fluid connection 81 is provided to communicate fluid from conduit 37 to a fluid pressure chamber 82 and past guide 75 to face 79 where the fluid acts to bias spool valve 73 in an open position thereby communicating fluid pressure from the pressure chamber 82 to sump 28. A fluid connection 83 is provided which communicates fluid pressure from conduit 38 to pressure chamber 84. This pressure acts against an end face 80 of the spool valve 73 to urge the spool valve 73 to a closed position thereby preventing the flow of fluid from pressure chamber 82 to sump 28. A resilient member shown in this embodiment as a spring 85 urges the spool valve 73 to a closed positin. A pilot relief valve 86 is provided in connection with pressure chamber 84 to serve as a safety valve by piloting the main spool 73 to sump in case of extreme pressure build-up in the agitate motor supply line 38. A pair of check valves 87 and 88 are provided respectively in fluid connections 83 and 81 to accommodate fluid flow only in the direction toward the bypass valve.

The agitator motor 21 is of the vane fluid motor type and receives fluid from the reversing valve 71. The agitator motor 21 includes a vane 89 connected to agitator 12 to thereby effect oscillation of the agitator 12. Any combination of commonly used vane fluid motors and reversing valves may be used, for example, the type whose operation is described in copending application Ser. No. 538,436 of common assignee. The conduit 90 supplies fluid pressure to reversing valve 71 which communicates the fluid to the vane motor 21 alternately through fluid passages 91 or 92. Fluid is exhausted from the reversing valve 71 to sump 28 by means of fluid connections 95 or 96.

Referring now to FIGURE 2, fluid conduit 35 communicates fluid from the constant volume pump 20 to a spin control valve 24. The spin control valve 24 is similar in construction and operation to the agitate control valve 22 except for the addition of land section 97 which coacts with a pair of annular grooves 98 and 99 to serve as a spin brake. For this reason, like numbers are used on both control valves to designate corresponding parts with the suffix A added to parts of control valve 24.

A spin motor 23 of the hydraulic transmission of the gerotor type is shown in FIGURE 2 although other fluid motors could also be used. The spin motor 23 includes an outer rotor 101 and an inner rotor 102. The outer rotor has recesses 103 therein adapted to receive the teeth 104 of the inner rotor 102. Fluid pressure is admitted during the spin cycle through conduit 106 and, in a known manner, will act in the fluid chambers between the teeth 104 of the inner rotor and the recesses 103 of the outer rotor to spin the outer and inner rotors as fluid pressure is received. Conduit 107 is the exhaust fluid connection for the spin motor 23 which is connected to the spin motor 23 in a known manner.

The inner rotor 102 is drivingly connected to the hollow shaft 108 which is part of the clothes basket 11 and thus, as the inner rotor 102 rotates, the clothes basket will be rotated at a speed dependent upon the flow admitted from the fluid conduit 106.

Fluid is exhausted from the spin motor 23 through conduit 107 and communicated to sump 28 through the annular grooves 98 and 99 of bore 49A.

The operation of the hydraulic transmission of the present invention in summary is as follows: the timer or cycle selector switch of the automatic washer schematically represented by switch 18 will select either the wash or spin cycle for the hydraulic transmission.

If the agitate cycle is selected, the pump 20 supplies fluid pressure to conduit 37. Fluid pressure admitted to bore 49 through fluid connection 64 acts to move the agitator control valve against the force of spring 63. This serves to admit fluid pressure from conduit 37 through fluid connection 65 to bore 49. The position of cam 44 will determine the size of the orifice 66 between land section 51 and edge 67.

Fluid leaves the bore 49 through fluid connection 70 at a pressure lower than the pressure of the fluid which enters the bore 49 in accordance with the principle well known in the art whereby a pressure drop will result when fluid flows through a restricted orifice.

The fluid leaving bore 49 is communicated to reversing valve 71 and agitate motor 21 through conduit 38 to drive the agitator 12 of the washing machine.

In the absence of bypass valve 25 it would be obvious that the variation in size of orifice 66 would have little effect on the speed of the agitate motor which is directly proportional to the volume of fluid supplied to reversing valve 71 per unit time.

Using a constant displacement pump, the effect of reducing the size of the orifice 66 would be to increase the average velocity of fluid across the orifice, the volume flow per unit time remaining unchanged.

Fluid pressure is admitted to pressure chamber 82 from conduit 37 through fluid connection 81 and through check valve 88 to act against end face 79 of the guide 75 to urge the spool valve 73 to the left allowing some of the fluid in pressure chamber 82 to escape to sump. It is evident from FIGURE 1 that the pressure of fluid supplied to pressure chamber 82 is substantially the same as the pressure of fluid supplied to orifice 66.

Fluid at the lower pressure is admitted to pressure chamber 84 from conduit 38 through fluid connection 83 and through check valve 87 to act against face 80 of the spool valve 73 which has the same area as face 79 of the guide 75. This force acts in cooperation with the force of spring 85 to bias the spool valve 73 to the right thereby restricting the flow of fluid from pressure chamber 82 to sump 28.

It can now be seen that the characteristics of the spring 85 determine the value of the pressure drop across the orifice 66. The pressure drop for any given size orifice is dependent upon the volume of fluid passed through the orifice per unit time. As the volume flow through the orifice increases, the resulting pressure drop across the orifice will correspondingly increase. The converse is also true.

If, for a range of orifice sizes, the desired pressure drop is, for example, 10 p.s.i., a spring will be chosen with characteristics such that it will exert a force equal to that exerted by a pressure of 10 p.s.i. against the area of face 80 of spool valve 73. It is understood, of course, that the variation in spring force due to compression of the spring is negligible due to the small displacements involved and allow spring constant. For the bypass valve to open the pressure of the fluid entering pressure chamber 82 flowing past guide 75 to 79 must exceed the pressure of the fluid entering pressure chamber 84 by at least 10 p.s.i. If the pressure differential hence the pressure drop across the orifice 66 is greater than 10 p.s.i., the bypass valve will open wider allowing a greater volume of fluid to be bypassed to sump and reducing the volume of fluid through hence the pressure drop across the orifice 66 until the pressure differential equals 10 p.s.i. when the system will remain in equilibrium.

If the pressure differential is less than 10 p.s.i., the spring force plus the pressure force on face 80 of the spool valve 73 will exceed the force on the face 79 of the guide 75 causing the valve 73 to close until the pressure differential reaches equilibrium at 10 p.s.i. Thus it has been shown that with the selection of the proper spring the pressure drop across the orifice 66 can be held to the same predetermined value over a range of orifice sizes. Making use of this principle, it has been further shown that by varying the size of the orifice 66, which is accomplished by varying the orientation of the cam 44, the volume of fluid per unit time passing through the orifice 66 and delivered to the agitator motor may be varied, the speed of the motor increasing as the flow increases.

If the spin cycle is selected, as shown in FIGURE 2, the pump 20 supplies fluid pressure to conduit 35. Fluid pressure is admitted to bore 49A through fluid connection 64A and moves the spool valve 48A against the force of spring 63A admitting fluid to the bore 49A through fluid connection 65A. The position of cam 44A will determine the size of the orifice 66A between land section 51A and edge 67A.

The fluid leaves the bore 49A at a pressure lower than the pressure of fluid which enters the bore for the same reasons as previously described. The fluid leaving the bore 49A is communicated to the spin motor 23 through conduit 36 and fluid connection 106 for the purpose of driving it. The speed of spin motor 23 like the speed of agitator motor 21 is dependent upon the rate of flow of fluid delivered to it, the motor speed increasing as the rate of flow increases and conversely.

A fluid conduit 109 delivers fluid from conduit 35 to pressure chamber 82 through a check valve 110 at substantially the same pressure as the fluid delivered to orifice 66A. A fluid conduit 112 delivers fluid to pressure chamber 84 through a check valve 113 at substantially the same pressure as that fluid leaving the bore 49A which is lower than the pressure of fluid delivered to orifice 66A. The action of the bypass valve 25 in the spin operation is the same as its action in the agitation operation which has been previously described.

In normal spin operation fluid is exhausted from the spin motor 23 through conduit 107 and carried to the annular groove 98 in the bore 49A. When the spin cycle is operating the spool valve 48A will be biased open sufficiently to allow a relatively unrestricted flow between annular groove 98 and the sump 28.

When, however, the cycle selector switch is moved from the "spin" position to the "off" position the fluid pressure in bore 49A is insufficient to overcome the force of the spring 63A and the spool valve 48A is biased closed as shown in FIGURE 1. The land 97 is now oriented such that the fluid flow between the annular groove 98 and the sump 28 is greatly restricted. This creates a pressure build up in conduit 107. Since the clothes basket 11 is still tending to spin, the restricted outlet will serve to stop relative rotation between the pump elements and thus serve as a hydraulic brake for clothes basket 11.

An alternative method of providing a spin brake would be to have land 97 completely cover groove 98 in the agitate or off position and provide a pressure relief valve in the line 107 between the spin motor 23 and the sump 28. The pressure relief valve could be set to open at any predetermined value which would allow a build up of sufficient fluid pressure in conduit 107 to stop relative rotation between the pump elements but not allow fluid pressure to reach a value sufficiently high to damage the system.

It will be apparent that the present invention advantageously provides a hydraulic transmission for independently driving either the agitator motor or the spin motor of an automatic washing machine which uses a fixed capacity hydraulic pump but includes controls for varying the speed of either motor without subjecting the system to the relatively high pressures inherent in present transmissions of this nature. The use of a fixed capacity pump rather than one of the variable capacity type results in a transmission which is more economical to manufacture and maintain and is inherently more trouble-free.

While a preferred embodiment of the invention has been specifically disclosed in the form of a washing machine transmission, it is to be understood that the principles of the invention could be as easily applied to hydraulic transmissions for other devices as is apparent to those skilled in the art. Therefore this invention is to be given its broadest interpretation within the scope of the following claims.

What is claimed is:

1. A hydraulic transmission including: a sump for hydraulic fluid; a fixed volume hydraulic pump connected to said sump whereby said hydraulic pump is operable in either direction of rotation; first and second variable speed hydraulic motors connected to said hydraulic pump whereby only one of said hydraulic motors is in fluid communication with said hydraulic pump for either direction of rotation of said pump; first valve means disposed between said hydraulic pump and said first variable speed motor defining a first variable size orifice; first control means associated with said first valve means which selectively position said first valve means to vary the size of said first orifice; second valve means disposed between said hydraulic pump and said second variable speed motor defining a second variable size orifice; second control means associated with said second valve means which selectively position said second valve means to vary the size of said second orifice; bypass valve means connected to said hydraulic pump, to said first valve means, to said second valve means and to said sump; means placing said bypass valve means in fluid communication with whichever of said first or second valve means is communicating hydraulic fluid to the variable speed hydraulic motor associated therewith whereby said bypass valve means is adapted to maintain the pressure drop across either said first or second variable size orifice at a fixed predetermined value for a range of orifice sizes so that by selectively varying the size of said orifice the fluid flow to said motor will be varied thereby selectively varying the speed of the variable speed hydraulic motor associated with said orifice.

2. A hydraulic transmission as in claim 1 wherein the speed of each of said first and second variable speed hydraulic motors is responsive to the flow of fluid measured in volume per unit time delivered to said motors, the speed of said motors increasing as the flow increases.

3. A hydraulic transmission as in claim 1 wherein each of said first and second valve means includes a spool valve acting within a bore, said spool valve coacting with said bore to define said variable size orifice through which orifice is communicated hydraulic fluid from the output of said fixed volume pump to the input of the variable speed hydraulic motor associated with said valve means whereby the speed of said motor varies in response to the volume flow per unit time through said orifice.

4. A hydraulic transmission as in claim 1 wherein each of said first and second control means includes a manually adjustable rotatable cam in contact with the respective valve means associated with said control means whereby the adjustment of said cam selectively determines the size of said variable size orifice which, in cooperation with said bypass valve means, controls the flow of fluid to said hydraulic motor associated with said valve means and thereby controls the speed of said motor.

5. A hydraulic transmission as in claim 1 wherein said bypass valve means includes a spool valve acting within a bore, said spool valve coacting with said bore to define a third variable size orifice in fluid communication with said sump, said bypass valve means further including a resilient member in contact with said spool valve, said resilient member acting to bias said spool valve in a direction so as to restrict or eliminate the flow of fluid through said third variable size orifice, whereby the characteristics of said resilient member determine the pressure drop across said first and second variable size orifices.

6. A hydraulic transmission as in claim 5 wherein said spool valve acts in response to the pressure drop across whichever of said first or said second variable size orifices is communicating hydraulic fluid to said variable speed hydraulic motor associated therewith to bypass a sufficient flow of fluid from the output of said hydraulic pump to said sump such that the flow across said first or second variable size orifice will result in a relatively constant pressure drop across said orifice over a range of orifice sizes.

References Cited

UNITED STATES PATENTS

| | | | |
|---|---|---|---|
| 2,102,865 | 12/1937 | Vickers | 60—52 |
| 2,255,787 | 9/1941 | Kendrick | 60—53 XR |
| 2,354,634 | 7/1944 | Griswold | 60—53 XR |
| 2,603,065 | 7/1952 | Sarto. | |
| 2,984,985 | 5/1961 | MacMillin. | |

EDGAR W. GEOGHEGAN, *Primary Examiner.*

U.S. Cl. X.R.

68—23